Nov. 30, 1926.
C. T. MASON
SOLDERING IRON
Original Filed August 2, 1924
1,608,949
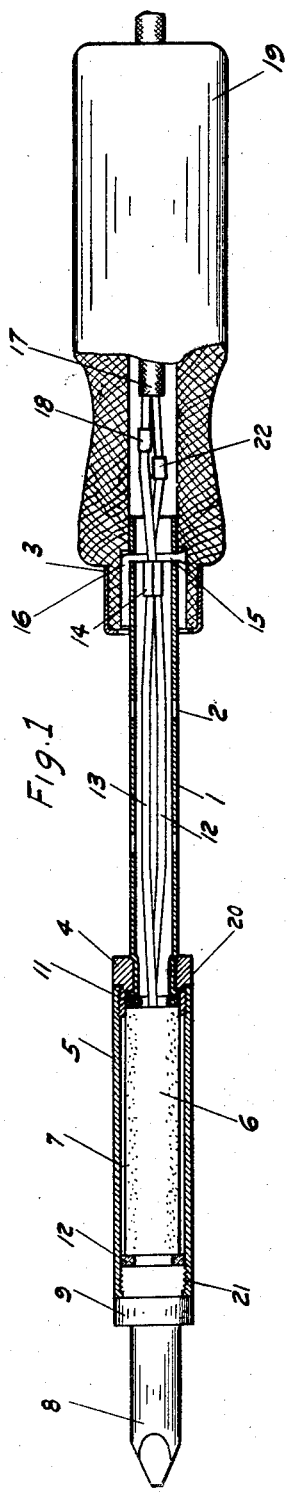
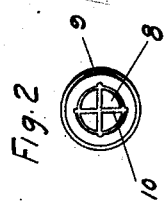
INVENTOR
CARL T. MASON
BY
A. D. Libby
ATTORNEY Patented Nov. 30, 1926.

1,608,949

UNITED STATES PATENT OFFICE.

CARL T. MASON, OF EAST ORANGE, NEW JERSEY, ASSIGNOR, BY MESNE ASSIGNMENTS, TO JOSEPH LOPIANO, OF JERSEY CITY, NEW JERSEY.

SOLDERING IRON.

Application filed August 2, 1924, Serial No. 729,779. Renewed June 19, 1926.

This invention relates to improvements in electric soldering irons.

One of the objects of my invention is to provide means for supporting the heating element within the conducting and protecting shell so that blows or rough handling will not break the element, which ordinarily comprises a tube of more or less fragile insulating material.

Another object of my invention is to provide a means for securely attaching the handle of the iron to the stem and at the same time to provide a means for preventing any strains due to pulls on the attachment cords from being transmitted to the conductors leading directly to the heating element.

Another object of my invention is to provide a positive union between a soldering tip of small size with a coupling member which engages the shell.

A still further object of my invention is to provide a very simple, cheap and inexpensive construction and one in which the parts may be quickly assembled or disassembled for the purpose of repairs.

These and other objects will be apparent to one skilled in this art after a study of the specification taken in connection with the annexed drawing, wherein:

Figure 1 is a partial longitudinal section through the complete soldering iron; while Figure 2 is an end view of the connector end of the soldering tip shown in Fig. 1.

In the drawings, 1 is a stem preferably with a series of perforations 2, which may be of any suitable size and arranged in any desirable manner. On one end of the stem 1 is mounted a bushing 4. As illustrated, the stem is press fitted into the bushing 4 and the end spun over at 20. Any other suitable connection of course may be utilized. The bushing 4 is threaded to receive a protecting and conducting shell 5, preferably made of good heat conducting material, such as copper. The other end of the shell 5 is internally threaded to receive the threads 21 of the coupling member 9, into which is pressed the soldering tip 8, after which the end of the tip 8 is staked at 10. When it is desired to use a larger tip, this may be threaded and screwed directly into the end of the shell 5.

Positioned within the shell 5 is a heating element 6, which consists of suitable resistance wire wound on an insulating medium, such as porcelain or lava, after which the unit is covered with or dipped into suitable fluid, preferably cementitious heat resisting material, as has been common practice in heating coils of this character for many years. I have not shown any particular method of connecting the leading in conductors to the resistance wire, as there are many old and well known ways of doing this and I utilize one of these old arrangements. In some soldering irons it has been proposed to cement the heating element 6 rigidly to the stem or in its seat. I have found that such a construction is very poor in that jars received during shipment break the heating units, which are built up on fragile material, the units being broken intermediate their ends or at the seat. To overcome this difficulty, I have provided a cushion 11, preferably of heat resisting material, such as asbestos yarn, which cushion is placed in a seat within the bushing 4. I also prefer to use a similar cushion 12 at the opposite end of the heating element, so that in screwing in the tip 8 this end of the heating element is similarly engaged by the cushion 12. In the drawing I have shown a space 7 between the heating element and shell. It is to be understood that in practice a thin layer of mica may be used in this space in order to protect the heating element from becoming in any way grounded to the shell 5.

Extending through the stem 1 from the heating element 6 is a pair of conductors 12 and 13, which are preferably insulated with asbestos and cotton covering, the cotton adding strength to the asbestos, which would not be strong enough of itself due to effects of the heat which extends outwardly along the stem, but which is dissipated by the openings 2. Near the outward end of the stem 1 and around the insulation of the conductors 12 and 13 is placed a clamping member or clip 14 and passing between these conductors, closely adjacent the clip 14, and through the wall of the stem 1, is a strain pin 15, one end of which 16 is bent over and lies substantially parallel with the wall of the stem 1. The handle 19, which is ordinarily made of wood is pressed over the end of the stem 1, thereby forcing the part 16 of the pin 15 into the material of the handle and forming a key which effectually prevents the handle from turning. A ferrule 3 is used on the handle to prevent the same from splitting. The conductors 12 and 13 are joined to the attachment cable 17 in any satisfactory manner as by connecting clips 18 and 22, which are preferably staggered and taped to prevent short circuiting.

It is apparent that my invention is susceptible of numerous changes in the details without departing from the spirit of my invention and the scope of the appended claims.

Having thus described my invention, what I claim is:

1. In a soldering iron including a heating element enclosed within a shell, said shell being supported at one end by a handle connecting stem and carrying at the other end a soldering tip, means for supporting said heating element especially at the stem end; comprising a seat around the end of the stem and flexible heat resisting packing material disposed within said seat around the end of said heating element.

2. In a soldering iron including a heating element enclosed within a shell, said shell being supported at one end by a handle connecting stem and carrying at the other end a soldering tip, means for supporting said heating element comprising a seat around the end of the stem and flexible heat resisting packing material disposed within said seat around the end of said heating element, together with similar packing material between the opposite end of the heating element and the end of the soldering tip.

3. In a soldering iron including a heating element enclosed within a shell, said shell being supported at one end by a handle connecting stem and carrying at the other end a soldering tip, means for protecting said heating element from harmful results due to blows or rough handling of the iron comprising a cushioning support at least at one end of the heating element.

4. In a soldering iron including a heating element enclosed within a shell, said shell being supported at one end by a handle connecting stem and carrying at the other end a soldering tip, means for protecting said heating element from harmful results due to blows or rough handling of the iron comprising a cushioning support of flexible heat resisting material at both ends of the heating element.

5. In a soldering iron, a stem preferably ventilated and having a handle on one end and a bushing on the other end, a shell supported at one end on said bushing and having a soldering tip connected to the other end, said stem and bushing forming a seat, a heating element within the shell having one end positioned within said seat and a cushion of flexible heat resisting material within said seat between it and the end of the heating element, and a similar cushion at the other end of the heating element between it and the end of said soldering tip.

6. In a soldering iron, a stem carrying at one end; a shell, soldering tip and heating element, and a handle on the other end, said heating element having conductors extending through the stem into the handle for attachment to a current supply cable, a strain clip fastened to said conductors within the stem and a pin passing through the sleeve between the conductors closely adjacent said clip on the side toward the handle end of said stem for the purpose described.

7. In a soldering iron, a stem carrying at one end; a shell, soldering tip and heating element, and a handle on the other end, said heating element having conductors extending through the stem into the handle for attachment to a current supply cable, a strain clip fastened to said conductors within the stem and a pin passing through the sleeve between the conductors closely adjacent said clip on the side toward the handle end of said stem for the purpose described, said pin having at least one end bent over and lying substantially parallel with said stem and adapted to engage the material of the handle and thereby act as a key.

8. In a soldering iron including a stem having a handle on one end and a shell on the other with a heating unit within the shell, said shell being threaded to receive either a soldering tip direct or a tip coupling, said coupling when used being press fitted and staked to said tip.

In testimony whereof, I affix my signature.

CARL T. MASON.